United States Patent [19]
Ohga et al.

[11] Patent Number: 5,338,327
[45] Date of Patent: Aug. 16, 1994

[54] METHOD OF FLAME ABRASION OF GLASS PREFORM

[75] Inventors: Yuichi Ohga; Toshio Danzuka; Masahide Saito; Kouji Amemiya; Hiroshi Yokota, all of Yokohama, Japan

[73] Assignee: Sumitomo Electrc Industries, Ltd., Osaka, Japan

[21] Appl. No.: 918,036

[22] Filed: Jul. 24, 1992

[30] Foreign Application Priority Data

Jul. 26, 1991 [JP] Japan ................... 3-187597
Oct. 31, 1991 [JP] Japan ................... 3-286349

[51] Int. Cl.⁵ .......................................... C03B 37/025
[52] U.S. Cl. .................................... 65/414; 65/2; 65/11.1; 65/61; 65/109; 65/416; 65/429
[58] Field of Search ............. 65/2, 3, 4, 3.12, 61, 65/104, 109, 11.1

[56] References Cited

U.S. PATENT DOCUMENTS

| | | | |
|---|---|---|---|
| 4,231,777 | 11/1980 | Lynch et al. | 65/109 |
| 4,645,451 | 2/1987 | Schneider et al. | 65/109 X |
| 4,863,501 | 9/1989 | Mansfield | 65/3.11 |
| 4,941,905 | 7/1990 | Narasimham | 65/3.12 |
| 5,116,400 | 5/1992 | Abbott et al. | 65/3.12 X |
| 5,211,730 | 5/1993 | Kanamori et al. | 65/2 X |

FOREIGN PATENT DOCUMENTS

| | | |
|---|---|---|
| 0216338 | 4/1987 | European Pat. Off. |
| 0253427 | 1/1988 | European Pat. Off. |
| 0440130 | 8/1991 | European Pat. Off. |
| 2589461 | 5/1987 | France . |
| 3-187944 | 8/1991 | Japan . |
| 82/00635 | 3/1982 | PCT Int'l Appl. |

Primary Examiner—Robert L. Lindsay
Attorney, Agent, or Firm—Cushman, Darby & Cushman

[57] ABSTRACT

A glass preform for an optical fiber is flame abrased with an oxyhydrogen flame while vertically suspending and rotating the glass preform and relatively moving one or both of the glass preform and the oxyhydrogen flame, whereby a surface of the glass preform is smoothened.

10 Claims, 3 Drawing Sheets

METHOD OF FLAME ABRASION OF GLASS PREFORM

BACKGROUND OF THE INVENTION

1. Field of the Invention

The present invention relates to a method of flame abrasion of a glass preform to remove unevenness on its surface and smoothen its surface so as to provide a glass preform which is suitable for the fabrication of an optical fiber.

2. Description of the Related Art

As a method for producing a high purity quartz preform for an optical fiber, a VAD (Vapor Phase Axial Deposition) method is known and widely used. FIG. 1 schematically illustrates the VAD method. In the VAD method, $SiO_2$ glass soot is synthesized using an oxyhydrogen flame 8 and deposited on a peripheral surface or a lower end of a starting member 6, for example, a quartz rod to form a porous glass preform 7 in an axial direction of the starting member 6. Then, the porous glass preform is sintered and vitrified to prepare a transparent glass preform.

Since the transparent glass preform has unevenness of several micrometers on its surface, the peripheral surface of the preform is smoothened by a flame abrasion with an oxyhydrogen flame. FIG. 2 illustrates a conventional flame abrasion method, in which a glass preform 2 is connected to supporting rods 1 which are attached to respective chucks 4, and the surface of the rotating glass preform 2 is heated with oxyhydrogen flames 3. In the conventional flame abrasion method, the glass preform is supported horizontally as shown in FIG. 2.

Recently, in view of the reduction of production cost of optical fibers, a diameter and a length of the preform for the optical fibers have been increased. When the glass preform is horizontally supported in the flame abrasion step, as a weight of the preform increases, too much weight is loaded on the supporting rods so that the rods may be broken.

As the diameter of the glass rod increases, a center part of the preform cannot be sufficiently heated only by heat of the oxyhydrogen flame during the flame abrasion and a large temperature difference is created between the center part and the peripheral surface part of the preform, whereby a thermal strain is generated in the glass preform, so that the preform often cracks during cooling after the flame abrasion.

SUMMARY OF THE INVENTION

One object of the present invention is to provide a method of flame abrasion of a glass preform with an oxyhydrogen flame, which prevents breakage of supporting rods for the preform due to the weight of the glass preform even when the glass preform has large dimensions and a larger weight.

Another object of the present invention is to provide a method of flame abrasion of a glass preform with an oxyhydrogen flame, which can prevent deposition of white powder of $SiO_2$ particles generated by the flame abrasion.

According to the present invention, there is provided a method of flame abrasion of a glass preform for an optical fiber, which comprises flame abrasing the glass preform which is vertically suspended and rotated with an oxyhydrogen flame while relatively moving at least one of the glass preform and the oxyhydrogen flame.

BRIEF DESCRIPTION OF THE INVENTION

FIG. 1 schematically shows a VAD method for producing a porous glass preform for an optical fiber, FIG. 2 schematically shows a conventional method of flame abrasion of a glass preform for an optical fiber, FIGS. 3 and 4 schematically show two embodiments of the method of flame abrasion of a glass preform for an optical fiber according to the present invention, FIGS. 5 and 6 schematically show two other embodiments of the method of flame abrasion of a glass preform for an optical fiber according to the present invention.

DETAILED DESCRIPTION OF THE DRAWINGS

In the present invention, the glass preform to be flame abrased is vertically suspended and rotated. Because of the vertical suspension of the glass preform, breakage of supporting rods due to the weight of the glass preform can be prevented.

Figure 3:
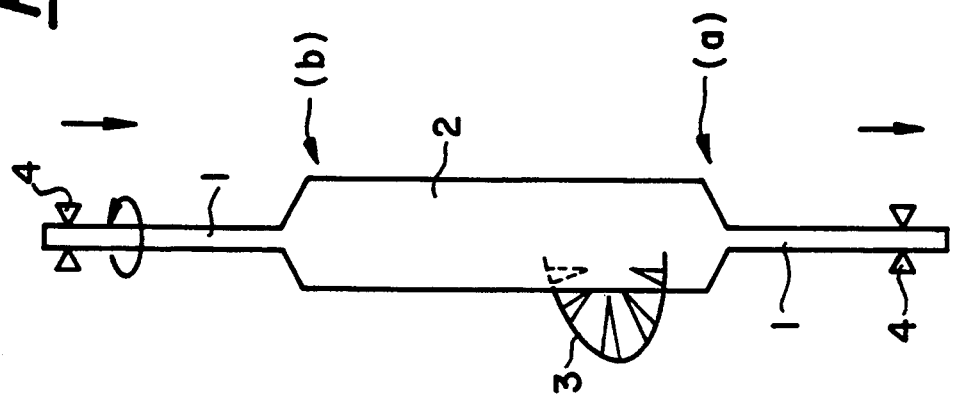

As shown in FIG. 3, a glass preform 2 is supported by a pair of supporting rods 1 which are attached to respective chucks 4 of a lathe (not shown) and rotated. The rotating glass preform 2 is heated with oxyhydrogen flames generated by burners 3, preferably, from its lower end (a) to its upper end (b). A relative speed between the glass preform and the burners is adjusted so that the abrased peripheral surface of the glass soot has desired smoothness. Such relative speed is easily determined by a simple experiment, and usually from 5 to 50 mm/min., preferably from 10 to 20 mm/min.

In FIG. 3, a position of the burner 3 is fixed, while the glass preform is moved downwardly, though it is possible to move the burner upwardly while fixing the glass preform, or to move the burner upwardly and the glass preform downwardly.

Figure 1:
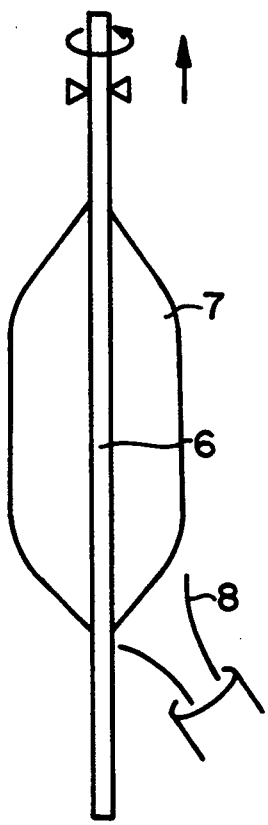
Figure 2:
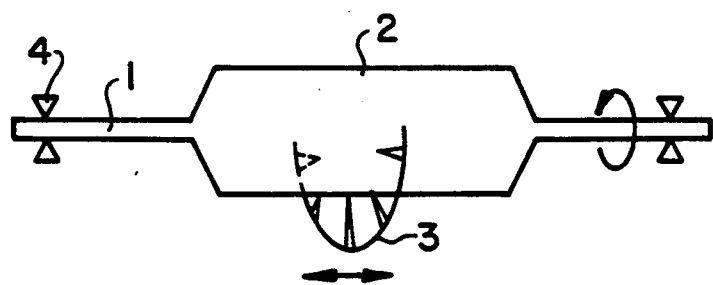
Figure 4:
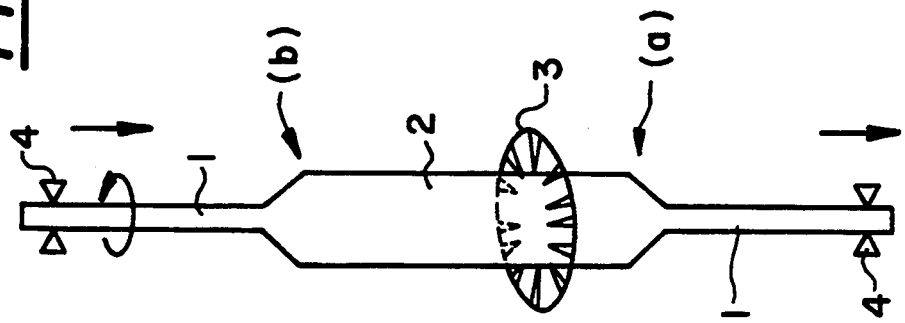

The burner may be the same as used in the conventional flame abrasion of the glass preform. The burner may be provided on one side of the glass preform as shown in FIG. 3 or all around of the glass preform as shown in FIG. 4.

When the glass preform is flame abrased from its lower end to the upper end, a part which is just above a part being flame abrased is heated with an upward flow of the heated gas, whereby the crack of the glass preform is prevented.

In one preferred embodiment, an auxiliary burner is provided below the burner for generating the oxyhydrogen flame to remove the $SiO_2$ white powder. A distance between the burner for flame abrasion and the auxiliary burner is usually from 20 to 100 mm, preferably from 30 to 80 mm.

To the auxiliary burner, any gas can be supplied insofar as deposition of the white powder generated by the oxyhydrogen flame is prevented.

For example, nitrogen gas is blown from the auxiliary burner but the temperature of the glass preform may be decreased. Preferably, the auxiliary burner is one for generating an oxyhydrogen flame to heat the glass preform.

PREFERRED EMBODIMENTS OF THE INVENTION

The flame abrasion method of the present invention will be explained further in detail by following Examples.

EXAMPLE 1

Around a quartz rod having a diameter of 30 mm, $SiO_2$ fine particles, which were produced by hydrolysis of $SiCl_4$ by the VAD method, were deposited to a thickness of 250 mm and a length of 1000 mm to form a porous preform, and the porous preform was heated and vitrified in a vacuum furnace kept at 1600° C. to obtain a transparent glass preform having a diameter of 120 mm, a length of 1000 mm and a weight of 36 kg. A surface roughness (center line average height) was measured by a surface roughness meter to find that it was 3 to 5 μm.

As shown in FIG. 3, to both ends of the glass preform 2, respective supporting rods 1 each having a diameter of 40 mm were attached and vertically supported by chucks 4 which could be vertically moved. Thirteen burners 3 for generating the oxyhydrogen flame were fixed at a certain position on one side of the glass preform as shown in FIG. 3. To each burner, hydrogen gas and oxygen gas were supplied at rates of 300 l/min. and 60 l/min., respectively.

The glass preform was downwardly moved at a rate of 10 mm/min. and flame abrased from its lower end (a) to its upper end (b). After the flame abrasion, the surface roughness of the glass preform was 1.0 μm.

From the obtained glass preform, an optical fiber having a diameter of 125 μm was drawn. Its tensile strength at break was 6.5 kg.

EXAMPLE 2

In the same manner as in Example 1, a glass preform having a length of 1000 mm and a diameter of 120 mm was produced.

Then, in the same manner as in Example 1 but using twelve burners 3 which were provided around the glass preform as shown in FIG. 4 and supplying hydrogen gas and oxygen gas at rates of 300 l/min. and 60 l/min., respectively to each burner, the glass preform was flame abrased from its lower end to its upper end, whereby the moving speed of the glass preform could be increased to 15 mm/min. The surface roughness of the flame abrased glass preform was 0.8 μm.

An optical fiber fabricated from this glass preform had a tensile strength at break of 7.0 kg.

EXAMPLE 3

Figure 5:
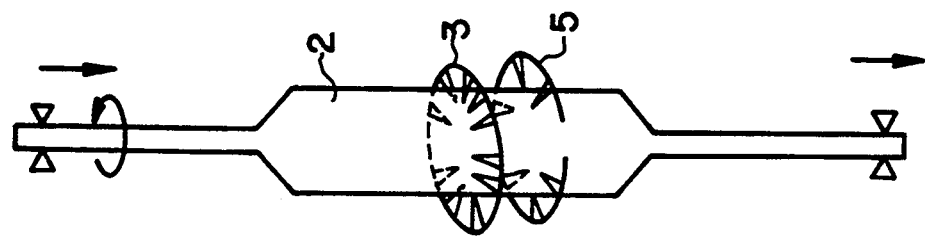

In addition to the twelve burners 3, six auxiliary burners 5 for supplying nitrogen gas were provided around the glass preform 30 mm below the burners 3 as shown in FIG. 5. To each of the burners 3, hydrogen gas and oxygen gas were supplied at rates of 400 l/min. and 80 l/min., respectively, and to each of the burners 5, nitrogen gas was supplied at a rate of 50 l/min. With the nitrogen gas jetted from the burners 5, the deposition of the white powder of $SiO_2$ was prevented. But, a temperature of flame abrasion was decreased.

The surface smoothness of the flame abrased glass preform was 0.5 μm.

An optical fiber fabricated from this glass preform had a tensile strength at break of 7 kg.

EXAMPLE 4

Figure 6:
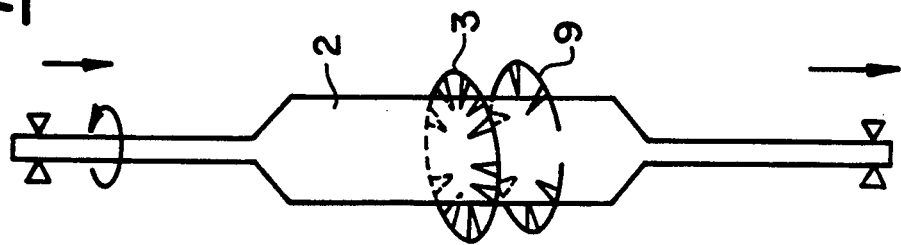

In addition to the twelve burners 3, six auxiliary burners 9 for generating oxyhydrogen flames were provided around the glass preform 30 mm below the burners 3 as shown in FIG. 6. To each of the burners 3, hydrogen gas and oxygen gas were supplied at rates of 400 l/min. and 100 l/min., respectively to increase the abrasion speed and to each of the burners 9, hydrogen gas and oxygen gas were supplied at rates of 60 l/min. and 20 l/min., respectively. With the oxyhydrogen flames from the auxiliary burners 9, the deposition of the white powder of $SiO_2$ was prevented.

The surface smoothness of the flame abrased glass was 0.5 μm.

An optical fiber fabricated from this glass preform had a tensile strength at break of 7 kg.

When a glass preform is flame abrased by the conventional method, its surface smoothness is 1.5 to 3.0 μm.

When an optical fiber is fabricated from the glass preform which is flame abrased by the conventional method, its tensile strength at break is only 5.5 to 6.0 kg.

What is claimed is:

1. A method of flame abrasion of a glass preform for an optical fiber, which process comprises:
    vertically suspending and rotating the glass preform;
    flame abrasing the glass preform which is vertically suspended and rotated with an oxyhydrogen flame from a first burner and a second flame from a second auxiliary burner located below the first burner; and
    relatively moving at least one of the glass preform and the oxyhydrogen and second flames.

2. The method according to claim 1, wherein said glass preform is flame abrased from its lower end to its upper end.

3. The method according to claim 1, wherein a relative speed between said glass preform and said burner is from 5 to 50 mm/min.

4. The method according to claim 1, wherein a distance between said burner for flame abrasion and said auxiliary burner is from 20 to 100 mm.

5. The method according to claim 4, wherein said auxiliary burner generates an oxyhydrogen flame.

6. The method according to claim 1, wherein the glass preform is flame abrased by at least one of the first and second burners which completely encircle the glass preform.

7. The method according to claim 1, wherein the glass preform is flame abrased by at least one of the first and second burners which partially encircle the glass preform.

8. An apparatus for flame abrasing a glass preform comprising:
    means for rotating and supporting the glass preform vertically;
    a first burner for supplying an oxyhydrogen flame to the glass preform;
    a second auxiliary burner located below the first burner; and
    means for relatively moving at least one of the glass preform and the first and second burners.

9. The apparatus according to claim 8, wherein at least one of the first and second burners completely encircles the glass preform.

10. The apparatus according to claim 9, wherein at least one of the first and second burners partially encircles the glass preform.

* * * * *